United States Patent
Lee et al.

(10) Patent No.: US 8,434,251 B2
(45) Date of Patent: May 7, 2013

(54) DISPLAY APPARATUS

(75) Inventors: Dong Jin Lee, Hwaseong-si (KR); Sang Hak Kim, Hwaseong-si (KR); Hyun Jun Jung, Yongin-si (KR); Jin Jung, Incheon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 150 days.

(21) Appl. No.: 12/951,343

(22) Filed: Nov. 22, 2010

(65) Prior Publication Data

US 2011/0126440 A1    Jun. 2, 2011

(30) Foreign Application Priority Data

Dec. 1, 2009  (KR) .................. 10-2009-0117930

(51) Int. Cl.
*A47G 1/06*  (2006.01)

(52) U.S. Cl.
USPC .............. 40/780; 292/80; 292/81; 349/58; 361/679.21

(58) Field of Classification Search .......... 24/291, 24/293, 295; 292/80–91, 303, DIG. 11, DIG. 53, 292/DIG. 61; 349/58
See application file for complete search history.

(56) References Cited

U.S. PATENT DOCUMENTS

| | | | | |
|---|---|---|---|---|
| 5,452,184 | A | | 9/1995 | Scholder et al. |
| 5,568,357 | A | * | 10/1996 | Kochis et al. ............ 361/679.26 |
| 5,813,793 | A | * | 9/1998 | Baucom ........................ 403/325 |
| 5,931,514 | A | * | 8/1999 | Chung ............................ 292/89 |
| 6,002,582 | A | * | 12/1999 | Yeager et al. ............ 361/679.21 |
| 6,212,366 | B1 | * | 4/2001 | Cheraso et al. ................ 455/351 |
| 6,315,142 | B1 | * | 11/2001 | Kitamura et al. ............ 220/4.02 |
| 6,318,585 | B1 | * | 11/2001 | Asagiri et al. ................ 220/788 |
| 6,512,558 | B2 | * | 1/2003 | Kim ................................ 349/58 |
| 7,002,792 | B2 | * | 2/2006 | Han et al. ................. 361/679.21 |
| 7,096,638 | B2 | * | 8/2006 | Osterland et al. ................ 52/708 |
| 7,427,088 | B1 | * | 9/2008 | Annerino et al. ............. 292/120 |
| 7,746,422 | B2 | * | 6/2010 | Hsiao ............................. 349/67 |
| 7,760,491 | B2 | * | 7/2010 | Choi ........................ 361/679.01 |
| 7,764,332 | B2 | * | 7/2010 | Zhang ............................ 349/58 |
| 7,791,879 | B2 | * | 9/2010 | Jiang et al. ............. 361/679.58 |
| 7,828,616 | B2 | * | 11/2010 | Kim et al. ........................ 445/24 |
| 7,874,775 | B2 | * | 1/2011 | Hullmann et al. ............ 411/173 |
| 7,907,233 | B2 | * | 3/2011 | Kang et al. ...................... 349/60 |
| 7,929,280 | B2 | * | 4/2011 | Choi ........................ 361/679.02 |
| 7,944,522 | B2 | * | 5/2011 | Yun et al. ........................ 349/58 |
| 7,984,935 | B2 | * | 7/2011 | Luo et al. ........................ 292/80 |
| 2004/0196413 | A1 | * | 10/2004 | Satonaka ........................ 349/58 |
| 2012/0014094 | A1 | * | 1/2012 | Yu ................................ 362/97.2 |

FOREIGN PATENT DOCUMENTS

JP     2009-058915 A     3/2009

* cited by examiner

*Primary Examiner* — Joanne Silbermann
*Assistant Examiner* — Shin Kim
(74) *Attorney, Agent, or Firm* — Sughrue Mion, PLLC

(57) ABSTRACT

Disclosed is a display apparatus including a first case and a second case coupled to each other to define an external appearance of the display apparatus. A fastening guide extends from an inner surface of the first case, and a fastening member is engaged with the fastening guide. The fastening member is provided with a boss portion for screw-fastening. The first case and second case are coupled to each other using the fastening guide and fastening member having a thin thickness, whereby a reduced thickness of fastening parts and stable inter-coupling of the first case and second case are accomplished.

14 Claims, 5 Drawing Sheets

DISPLAY APPARATUS

CROSS-REFERENCE TO RELATED APPLICATION

This application claims priority from Korean Patent Application No. 10-2009-0117930, filed on Dec. 1, 2009 in the Korean Intellectual Property Office, the disclosure of which is incorporated herein by reference.

BACKGROUND

1. Field

Exemplary embodiments relate to a display apparatus including a first case and a second case, which are coupled to each other to define an external appearance of the display apparatus.

2. Description of the Related Art

Generally, a display apparatus refers to an apparatus including a display panel on which an image is displayed. Examples of a display apparatus include a Liquid Crystal Display (LCD), Plasma Display Panel (PDP), and the like.

A display apparatus includes a first case and a second case, which are coupled to each other in a front-and-rear direction. A panel assembly including a display panel is mounted between the first case and the second case. The first case has an opening to expose a front surface of the panel assembly to the outside.

To enable inter-coupling of the first case and second case, the first case is provided with bosses and the second case is provided with holes. Specifically, each boss integrally extends from an inner surface of the first case and has a screw-fastening hole, and, and the hole of the second case is configured to allow a screw to penetrate therethrough and be fastened through the screw-fastening hole.

Accordingly, as a screw penetrates through the hole of the second case and the screw-fastening hole of the boss of the first case after the second case covers a rear surface of the first case, inter-coupling of the first case and second case is completed.

Recently, to improve the external appearance of the display apparatus, the display apparatus is being developed to reduce a width of a front rim surface of the first case as much as possible.

SUMMARY

Therefore, it is an aspect of an exemplary embodiment to provide a display apparatus, which assures stable inter-coupling of a first case and a second case even if the first case around a display part is thin in width.

Additional aspects of the exemplary embodiment will be set forth in part in the description which follows and, in part, will be obvious from the description, or may be learned by practice of the invention.

In accordance with one aspect of the exemplary embodiment, a display apparatus includes a first case and a second case coupled to each other to define an external appearance of the display apparatus, at least one fastening guide extending from an inner surface of the first case, and a fastening member engaged with the fastening guide and having a boss portion to screw-fasten the first case and the second case to each other.

The fastening member may include a first holder caught by one side surface of the fastening guide and a supporter abuts the other side surface of the fastening guide, and the fastening guide may be provided at one side surface thereof with a holding protrusion by which the first holder is caught.

The display apparatus may further include a panel assembly installed between the first case and the second case.

The fastening member may include a second holder caught by the panel assembly, and the panel assembly may be provided at a side end thereof with a holding recess by which the second holder is caught.

The first case may include an opening to expose a front surface of the panel assembly to the outside, and the at least one fastening guide may include a plurality of fastening guides extending parallel to an outer rim of the first case and spaced apart from one another around the opening.

At least one of a first holder, the second holder, and a supporter may be formed by cutting and bending a portion of the fastening member.

The boss portion may be provided with a fastening hole for fastening of a screw, and the second case may be provided at a position corresponding to the fastening hole with a hole through which the screw penetrates.

The fastening member may have a U-shaped cross section so that the fastening guide is inserted in the center of the fastening member, and may be provided at one side thereof with a first holder and at the other side thereof with a supporter.

The fastening member may include a first member, which is made of an elastically deformable material and is centrally bent to have a U-shaped cross section, the first member being provided at one side thereof with the first holder and a second holder and at the other side thereof with the supporter, and a second member which is installed to the center of the first member and has the boss portion.

The first case may include a front surface defining an opening and a first side surface extending rearward from an outer edge of the front surface, the second case may include a rear surface and a second side surface extending forward from an outer edge of the rear surface so as to be located inside the first side surface, and the fastening guide may include a first supporting rib adjacent to a side surface of the panel assembly and a second supporting rib to support the second side surface.

In accordance with another aspect of the exemplary embodiment, a display apparatus includes a first case and a second case coupled to each other to define an external appearance of the display apparatus, a panel assembly installed between the first case and the second case, a fastening guide extending from an inner surface of the first case, and a fastening member engaged with the fastening guide, the fastening member serving to assemble the panel assembly to the first case and simultaneously, to couple the first case and second case to each other.

The fastening member may include a boss portion provided with a fastening hole for fastening of a screw, and the second case may be provided at a position corresponding to the fastening hole with a hole through which the screw penetrates.

The fastening member may include a first holder caught by one side surface of the fastening guide, and the fastening guide may be provided at one side surface thereof with a holding protrusion by which the first holder is caught.

The fastening member may further include a supporter abutting the other side surface of the fastening guide.

The fastening member may include a second holder caught by a side surface of the panel assembly, and the panel assembly may be provided at the side surface thereof with a holding recess by which the second holder is caught.

BRIEF DESCRIPTION OF THE DRAWINGS

These and/or other aspects of the exemplary embodiments will become apparent and more readily appreciated from the following description of the exemplary embodiments, taken in conjunction with the accompanying drawings of which.

DETAILED DESCRIPTION

Figure 1:
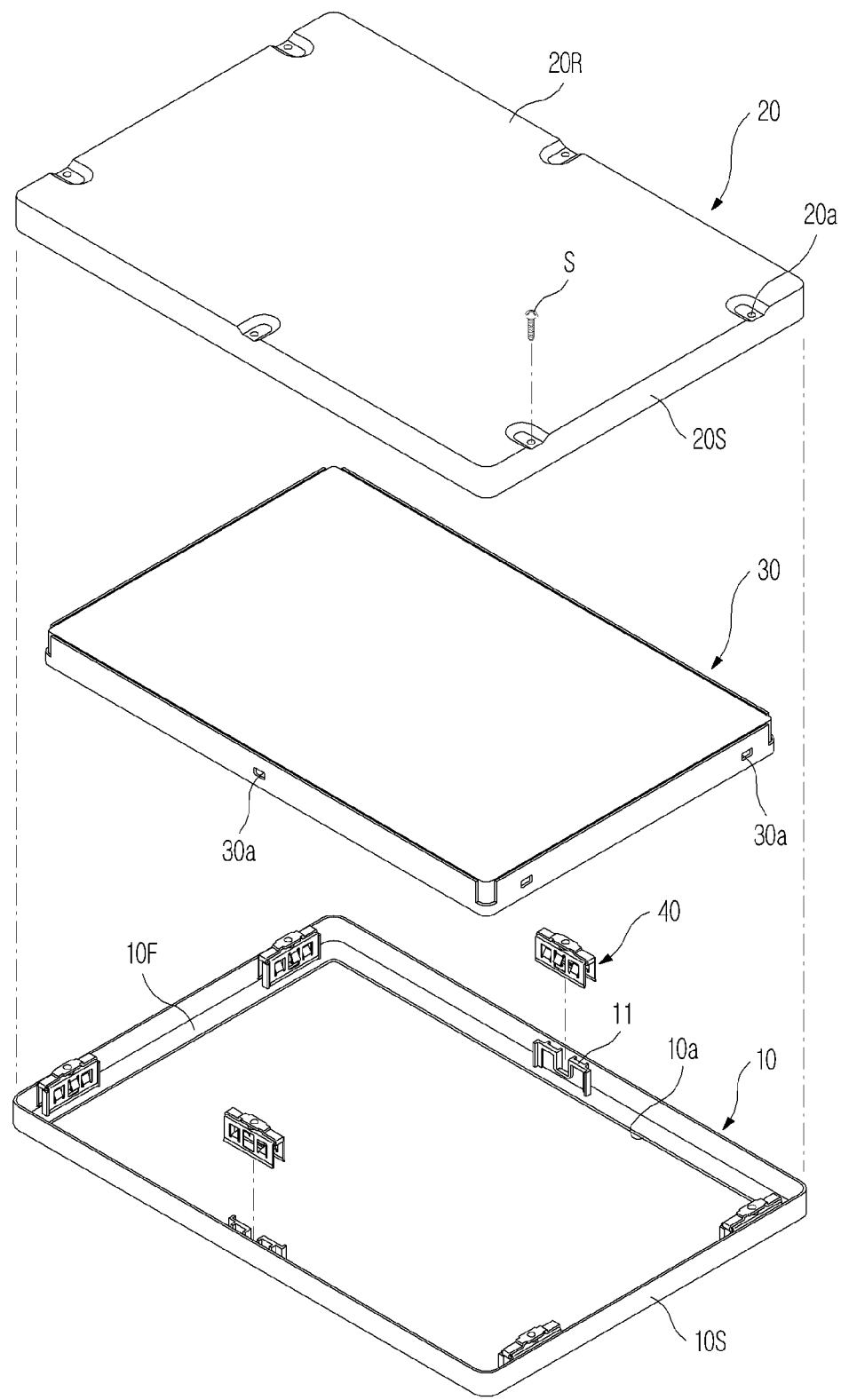
FIG. 1 is an exploded perspective view of a display apparatus according to an exemplary embodiment.

Reference will now be made in detail to a display apparatus according to an exemplary embodiment, examples of which are illustrated in the accompanying drawings, wherein like reference numerals refer to like elements throughout.

The display apparatus according to the exemplary embodiment, as illustrated in FIG. 1, includes a first case 10 and a second case 20, which are coupled to each other in a front-and-rear direction to define an external appearance of the display apparatus, and a panel assembly 30 interposed between the first case 10 and the second case 20. The first case 10 has an opening 10a to expose a front surface of the panel assembly 30 to the outside.

The first case 10 includes a front surface 10F defining the opening 10a and a first side surface 10S extending rearward from an outer edge of the front surface 10F. The second case 20 includes a rear surface 20R and a second side surface 20S extending forward from an outer edge of the rear surface 20R so as to be located inside the first side surface 10S.

The panel assembly 30 is constructed by assembling a display panel (not shown), such as a liquid crystal panel, a backlight unit (not shown), and the like.

Figure 2:
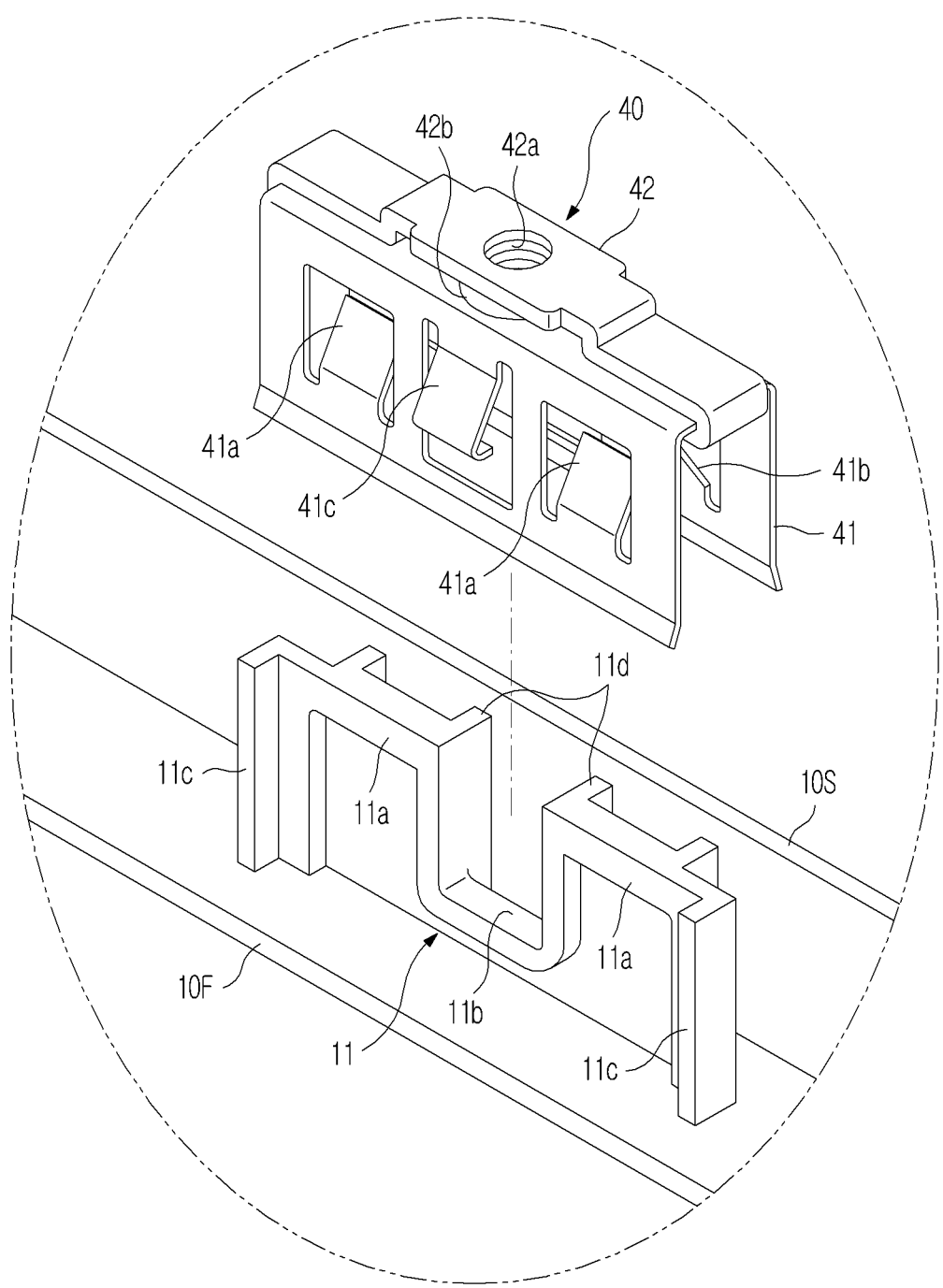
FIG. 2 is a perspective view illustrating an engagement relationship between a fastening guide and a fastening member.
Figure 3:
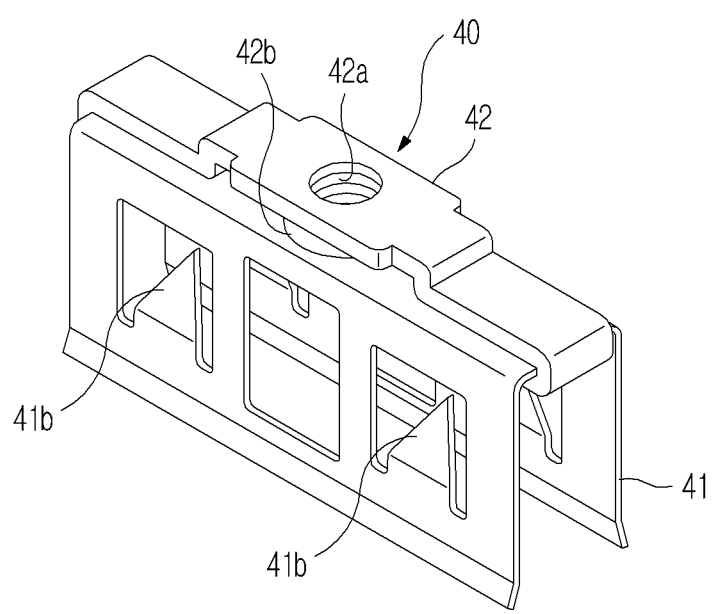
FIG. 3 is a perspective view illustrating the fastening member when viewed from an opposite side of FIGS. 2.

As illustrated in FIGS. 2 and 3, to enable inter-coupling of the first case 10 and second case 20, at least one fastening guide 11 integrally extends from an inner surface of the first case 10. In another exemplary embodiment, the fastening guide is separate from the first case 10. The fastening guide 11 is engaged with a fastening member 40 having a boss portion 42b in which a fastening hole 42a for receiving a screw S is formed. In addition, at least one hole 20a is perforated in the rear surface 20R of the second case 20 at a position corresponding to the fastening hole 42a, to allow the screw S to penetrate through the hole 20a and be fastened through the fastening hole 42a.

The fastening guide 11 is shaped to have a thin thickness and extends substantially parallel to an outer rim of the first case 10 or a rim of the opening 10a. This makes it possible to reduce a thickness of a structure required to inter-couple the first case 10 and second case 20 to the maximum extent, thus allowing a width of a front rim surface of the first case 10 to be reduced to the maximum extent. Furthermore, if the first case 10 and second case 20 are coupled to each other by use of the fastening guide 11, a force acting upon inter-coupling of the first case 10 and second case 20 is distributed in a longitudinal direction of the fastening guide 11 and therefore, it may be possible to prevent the first case 10 from being deformed during inter-coupling.

In the exemplary embodiment, a plurality of fastening guides 11 are spaced apart from one another around the opening 10a, and a plurality of fastening members 40 are provided to correspond to the plurality of fastening guides 11. Accordingly, the fastening guides 11 are engaged with the fastening members 40 in a one-to-one ratio.

To enable engagement of the fastening member 40 and fastening guide 11, the fastening member 40 is provided at one side thereof with a plurality of first holders 41a to be caught by one side surface of the fastening guide 11 and, at the other side thereof with a plurality of supporters 41b to abut the other side surface of the fastening guide 11. In the exemplary embodiment, the plurality of first holders 41a including a pair of first holders and the plurality of supporters 41b including a pair of supporters are provided and are respectively spaced apart from each other in the longitudinal direction of the fastening guide 11. In another exemplary embodiment, there may be more than two first holders and two supports in the plurality of first holders 41a and the plurality of supporters 41b, respectively. In the present exemplary embodiment, the number of first holders and the number of supporters are the same, but in another exemplary embodiment, the number of first holders and the number of supporters may not be the same.

The fastening guide 11 is provided at a tip end of one side surface thereof with holding protrusions 11a such that tip ends of the first holders 41a are caught by the holding protrusions 11a.

The fastening member 40 is further provided with a second holder 41c. The second holder 41c is configured to be caught by the panel assembly 30, thus allowing the panel assembly 30 to be coupled to the first case 10. The panel assembly 30 has a holding recess 30a indented in a side surface thereof such that the second holder 41c is caught by the holding recess 30a.

The fastening member 40 consists of a first member 41, which is centrally bent to have a U-shaped cross section, and a second member 42, which is installed to the center of the first member 41 and has the boss portion 42b. The pair of first holders 41a is located parallel to each other at one side of the first member 41, and the second holder 41c is located between the pair of first holders 41a. In an alternative embodiment, there may be only one first holder and one second holder disposed next to the first holder. In yet another embodiment, there may be two first holders and the second holder may be disposed to one side of the two first holders. In another embodiment, only the first holders may be present without the second holders. In variations of all the above embodiments, the plurality of first holders are present without the plurality of supporters.

The first member 41 is made of an elastically deformable material, such that the first holders 41a are caught by the holding protrusions 11a immediately after passing through the holding protrusions 11a. In exemplary embodiment, the first holders 41a snap into a recess formed at least in part by the holding protrusions 11a. The supporters 41b are elastically disposed on one side surface of the first member 41, and abut one side of the fastening guide 11. The second member 42 is formed into a rigid body having a predetermined strength or more to assure firm fastening of the screw S. In the exemplary embodiment, the first member 41 and second member 42 are respectively made of metals and more particularly, the first member 41 is formed to have a sufficient strength as well as elastic deformation ability, and the second member 42 is formed not only to assure stable fastening of the screw S with respect to the first member 41, but also to have a thin thickness. In the exemplary embodiment, the first holders 41a, the second holder 41c and the supporters 41b are formed by cutting and bending some portions of the first member 41 made of a metal.

The fastening guide 11 is provided at a longitudinal center position thereof with an indentation 11b. The indentation 11b is positioned to correspond to the second holder 41c, thus allowing the second holder 41c to be elastically deformed toward the fastening guide 11. Through its elastic property, the second holder 41c urges against the panel assembly 30 so the panel assembly 30 is correctly disposed in the first case 10. In addition, the fastening guide 11 is provided at one side surface thereof with first supporting ribs 11c and, at the other side surface thereof with second supporting ribs 11d. The first supporting ribs 11c is adjacent to the panel assembly 30, and the second supporting ribs 11d serve to support the second side surface 20S of the second case 20 inserted between the first side surface 10S of the first case 10 and the fastening guide 11. In an exemplary embodiment, the supporting ribs 11c may be in contact with the panel assembly 30 to support the side surface of panel assembly 30.

Figure 4:
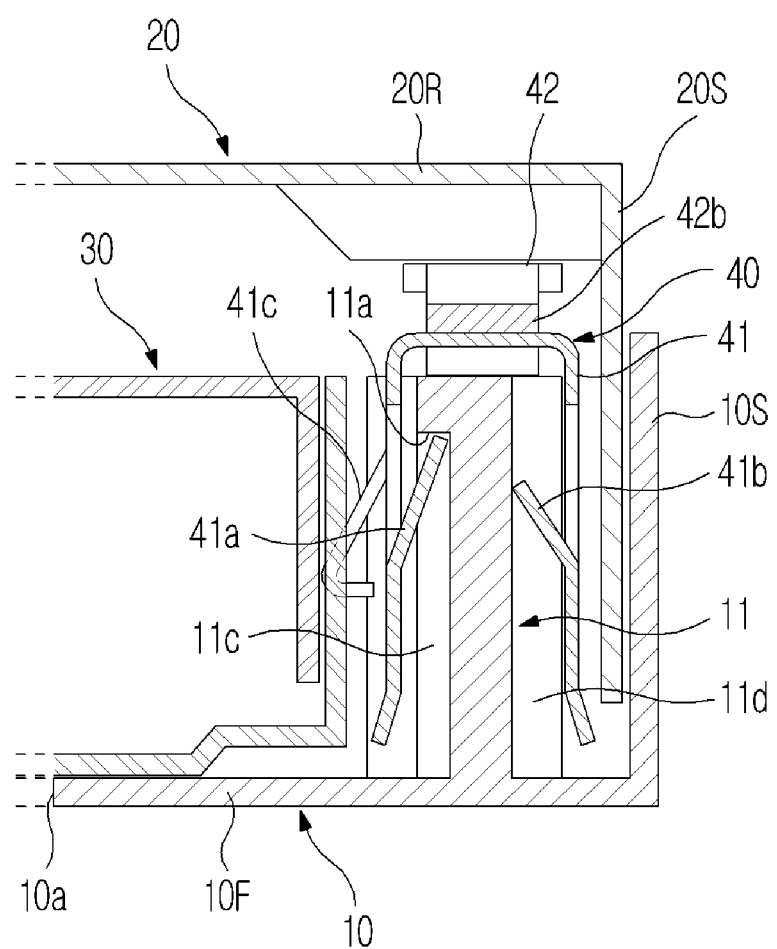
FIGS. 4 and 5 are sectional views illustrating the inter-coupled state of a first case and a second case.

Accordingly, once the fastening member 40 is engaged with the fastening guide 11 as illustrated in FIG. 4, the first holders 41a provided at one side of the fastening member 40 undergo elastic deformation to slide over the holding protrusions 11a and then, undergo elastic restoration as soon as they slide over the holding protrusions 11a. Thereby, the first holders 41a are caught by, i.e., engage, the holding protrusions 11a, preventing the fastening member 40 from being separated from the fastening guide 11. In this case, the supporters 41b provided at the other side of the fastening member 40 undergo elastic deformation as the fastening member 40 is engaged with the fastening guide 11, thus being elastically abutting the other side surface of the fastening guide 11 and consequently, keeping the first holders 41a engaged by the holding protrusions 11a. In other words, the supporters 41b urge against the fastening guide 11 to push the first holders 41a against the fastening guide 11 and to prevent the first member 41 from shifting so that the first holders 41a disengage from or slide over the protrusions 11a. In an exemplary embodiment, both the first holders 41a and the supporters 41b urge against the fastening guide 11 in opposing directions so that that fastening guide 11 is stably engaged with the first member 41.

Figure 5:
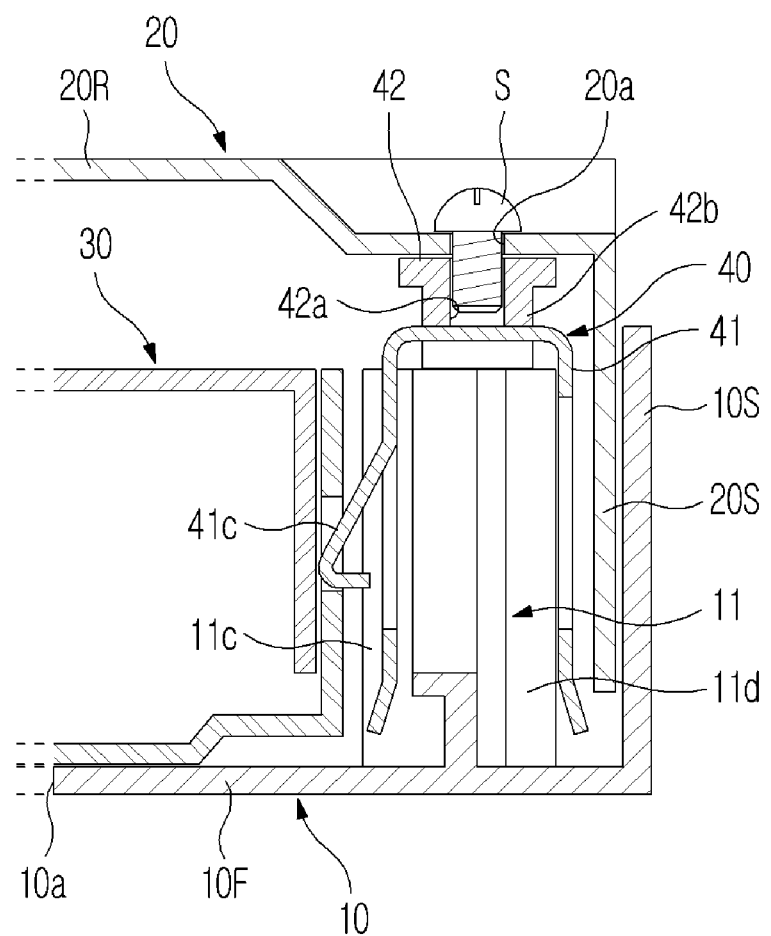

After engagement of the fastening member 40 and fastening guide 11 is completed, the panel assembly 30 is placed inside the first case 10. When the panel assembly 30 is placed inside, the fastening member 40 engages with the fastening guide 11 (the plurality of fastening guides being disposed around the opening 10a), as illustrated in FIG. 5, the second holder 41 c provided at the fastening member 40 is first elastically deformed toward the indentation 11b and then, is elastically restored so as to be caught by, i.e., engages, the holding recess 30a formed in the side surface of the panel assembly 30. Thereby, the panel assembly 30 is fastened to the first case 10 through the engagement of a number of second holders of a number of first members disposed about the opening 10a.

After the panel assembly 30 is fastened to the first case 10, the second case 20 is coupled to the first case 10 such that the second side surface 20S of the second case 20 is inserted between the other side of the fastening member 40 and the first side surface 10S of the first case 10. Thereafter, as the screw S having passed through the hole 20a in the rear surface of the second case 20 and through the fastening hole 42a, inter-couples, couples, or fastens the first case 10 and second case 20 together. In another exemplary embodiment, the fastening member 40 may be affixed to the second case 20. In yet another exemplary embodiment the fastening member 40 may be integrally formed with the second case 20, and be made of the same material as the second case 20.

As apparent from the above description, in a display apparatus according to the exemplary embodiments, a fastening member having a boss portion is engaged with a fastening guide integrally extending from a first case, resulting in a reduced thickness of fastening parts and stable inter-coupling of the first case and second case.

Furthermore, a force acting upon inter-coupling of the first case and second case may be distributed in a longitudinal direction of the fastening guide, and this may greatly reduce the possibility of deformation of the first case during inter-coupling. For example, the front surface of the first case may be less subject to deformation due to the use of screws to directly couple the front case to the second case, so that the front surface remains uniformly flat. In addition, the first case and the second case are snapped together, without using screws, simplifying the processing of putting the first case and the second case together.

Although the exemplary embodiments of the present invention has been shown and described, it would be appreciated by those skilled in the art that changes may be made in these embodiments without departing from the principles and spirit of the invention, the scope of which is defined in the claims and their equivalents.

What is claimed is:

1. A display apparatus comprising:
   a first case comprising a fastening guide extending from a front surface of the first case so that a gap is formed between a side surface of the first case and the fastening guide;
   a second case coupled to the first case so that a side surface of the second case is disposed at the gap;
   a panel assembly installed between the first case and the second case; and
   a fastening member provided removably from the panel assembly, the first and second cases to attach the second case to the fastening member,
   wherein the fastening member engages the fastening guide of the first case to couple the first case and the second case together, the fastening guide is inserted into the fastening member so that a portion of the fastening guide is disposed between the side surface of the second case and the fastening guide.

2. The display apparatus according to claim 1, wherein the fastening member further comprises:
   a first holder caught by one side of the fastening guide; and
   a supporter which abuts another side of the fastening guide;
   and fastening guide comprises a protrusion by which the first holder is caught, the protrusion being disposed at one side of the fastening guide.

3. The display apparatus according to claim 2, wherein the fastening member further comprises a second holder caught by the panel assembly, and the panel assembly comprises a recess at a side end of the panel assembly, by which the second holder is caught.

4. The display apparatus according to claim 1, wherein the first case further comprises an opening exposing a front surface of the panel assembly to an outside, and the fastening guide is of a plurality of fastening guides extending parallel to an outer rim of the first case and disposed around the opening.

5. The display apparatus according to claim 3, wherein at least one of the first holder, the second holder, and the supporter is formed by cutting and bending a portion of the fastening member.

6. The display apparatus according to claim 1, wherein the portion comprises a screw hole for receiving a screw, and the second case comprises a corresponding hole at a position corresponding to the screw hole, through which the screw penetrates.

7. The display apparatus according to claim 1, wherein the fastening member further comprises a U-shaped cross section so that the fastening guide is inserted at a center of the fastening member, a first holder at one side of the fastening member, and a supporter at another side of the fastening member.

8. The display apparatus according to claim 7, wherein the fastening member further comprises a first member, which is made of an elastically deformable material and is centrally bent to have the U-shaped cross section, the first member being provided at one side of the first member with the first holder and a second holder and at another side of the first member with the supporter, and a second member which is installed in between the first member and has the portion.

9. The display apparatus according to claim 1, wherein the first case further comprises a front surface defining an opening and a first side surface extending rearward from an outer edge of the front surface, the second case comprises a rear surface and a second side surface extending forward from an outer edge of the rear surface so as to be located inside the first side surface, and the fastening guide includes a first supporting rib adjacent to a side surface of the panel assembly and a second supporting rib to support the second side surface.

10. A display apparatus comprising:
   a first case having a front surface and at least one side surface;
   a second case coupled to the first case to define an external appearance of the display apparatus and at least one side surface;
   a panel assembly disposed between the first case and the second case;
   a fastening guide extending from a front surface of the first case so that a gap is formed between the at least one side surface of the first case and the fastening guide, the at least one side surface of the second case is disposed at the gap; and
   a fastening member provided removably from the panel assembly, the first and second cases and engaged with the fastening guide, one part of the fastening member being disposed between the at least one side surface of the second case and the fastening guide and the other part of the fastening member contacting the panel assembly.

11. The display apparatus according to claim 10, wherein the fastening member comprises a portion comprising a screw hole for receiving a screw, and the second case comprises a corresponding hole at a position corresponding to the screw hole, through which the screw penetrates.

12. The display apparatus according to claim 10, wherein the fastening member comprises a first holder caught by one side surface of the fastening guide, and the fastening guide comprises a protrusion by which the first holder is caught, the protrusion being disposed at one side of the fastening guide.

13. The display apparatus according to claim 12, wherein the fastening member further includes a supporter abutting another side surface of the fastening guide.

14. The display apparatus according to claim 10, wherein the fastening member comprises a second holder caught by a side surface of the panel assembly, and the panel assembly comprises a recess at a side surface of the panel assembly, by which the second holder is caught.

* * * * *